United States Patent [19]

Anderson

[11] 3,735,662
[45] May 29, 1973

[54] SAW CHAIN
[76] Inventor: Roy H. Anderson, 1701 90th Street, Bellevue, Wash. 98004
[22] Filed: Aug. 11, 1970
[21] Appl. No.: 62,848

[52] U.S. Cl. ................................................. 83/830
[51] Int. Cl. .......................................... B27b 33/14
[58] Field of Search ...................... 143/135 R, 135 G, 143/135 H

[56] References Cited
UNITED STATES PATENTS

| | | | |
|---|---|---|---|
| 1,150,218 | 8/1915 | Martin | 143/135 R |
| 2,857,942 | 10/1958 | Mall | 143/135 R |
| 2,771,919 | 11/1956 | Cox | 143/135 R |
| 2,832,380 | 4/1958 | Crowe | 143/135 G |
| 3,543,817 | 12/1970 | Anderson | 143/135 R |

Primary Examiner—Donald R. Schran
Attorney—Seed, Berry and Dowrey

[57] ABSTRACT

A saw chain made up of a series of link sequences with each sequence including cutter link means, a raker tooth link, a depth gauge link, at least one spacer drive link and side connector links. The raker tooth link, the depth gauge link and spacer drive link are center links, i.e., located on the longitudinal centerline of the chain while the cutter link means is made up of two oppositely facing side cutters located in the general planes of the side connector links, and mounted on common pivotal axes which connect them to both the depth gauge link and raker tooth link. At least one of each pair of side mounted cutter links includes a depth gauge element integral therewith.

8 Claims, 6 Drawing Figures

PATENTED MAY 29 1973 3,735,662
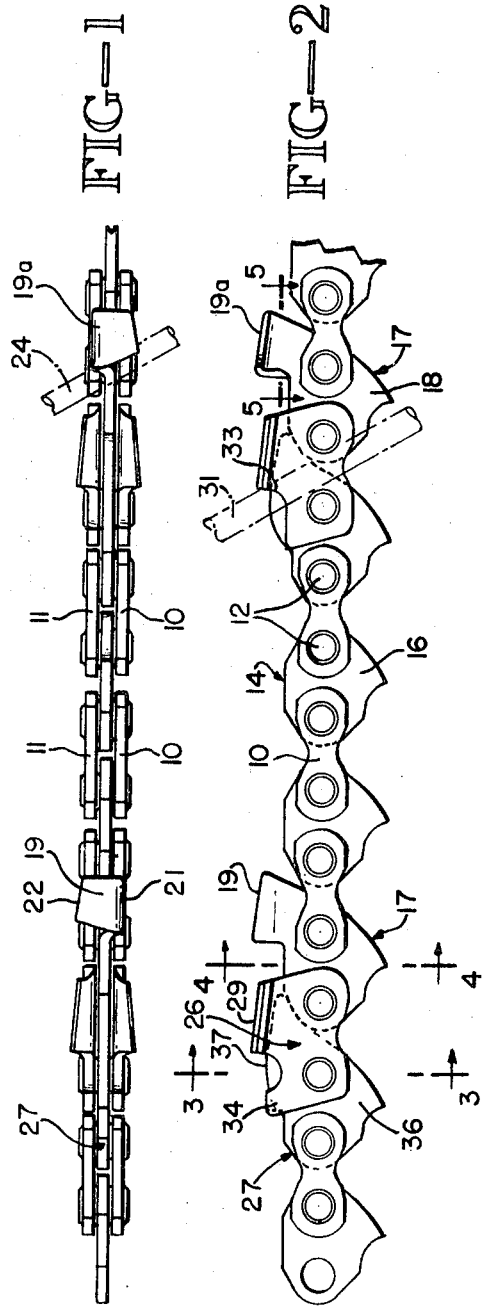
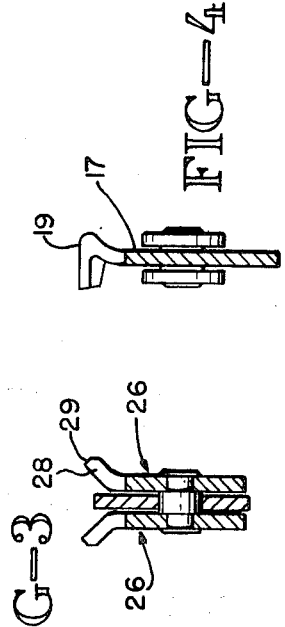
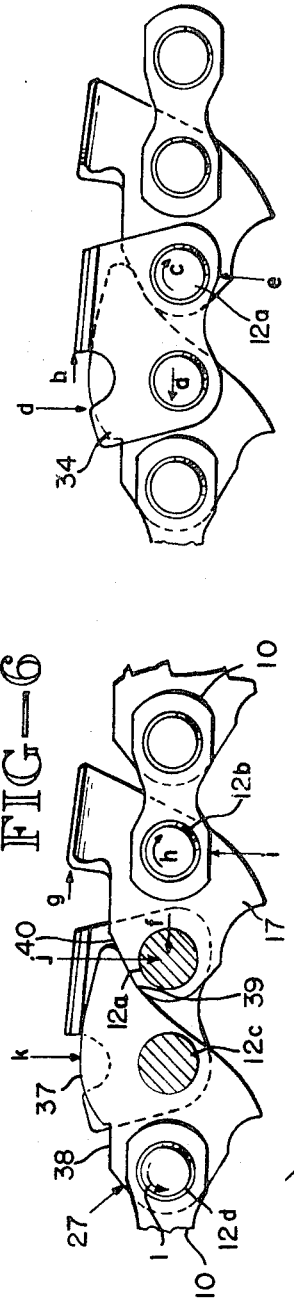
ROY H. ANDERSON
INVENTOR.
BY *[signature]*
ATTORNEYS

3,735,662

SAW CHAIN

BACKGROUND OF THE INVENTION

The present invention relates to saw chains in general and in particular to a saw chain wherein the sequence of links is comprised of cutter link means, a raker tooth link, a depth gauge link, at least one spacer drive link and side connector links. The raker tooth link, the depth gauge link and spacer drive link are center links, i.e., located on the longitudinal center line of the chain while the cutter link means is made up of two oppositely facing side cutters located in the general planes of the side connector links, and mounted on common pivotal axes which connect them to both the depth gauge link and raker tooth link. At least one of each pair of side mounted cutters additionally includes a depth gauge element integral therewith and positioned forwardly of the cutter elements. The integral depth gauge element functions as a depth gauge for the cutter link while the center mounted depth gauge link located between the side cutter links functions as a depth gauge for the raker tooth link.

The depth gauge link is of a novel configuration so as to act to limit the depth of cut of the raker tooth under all circumstances. The depth gauge link has a curved upper edge located between the side cutters and their depth gauge elements so as to keep the depth of cut constant as the links rock about their pivots under load or as the links travel around the end of the chain bar. In addition, the present configuration overcomes many difficulties experienced with prior art chains of this type in that the depth gauge link also serves to prevent clogging or wadding in front of the side mounted cutters. Chips are prevented from being removed by the side cutters because of the presence of the depth gauge therebetween. This allows the chip to remain in place until removed by a raker tooth or other raker means which immediately follows the side cutters. In addition the forward edges of the depth gauge links are so formed as to aid in the removal of loose chips and the depth gauge elements on the side cutters may be staggered to allow for better chip flow.

The present configuration is thus an improvement over U.S. Pat. No. 3,346,025 of which I am co-inventor and the saw chain configuration disclosed in my co-pending patent application Ser. No. 698,055, "Saw Chain," filed Jan. 15, 1969, now U.S. Pat. No. 3,543,817. The saw chain disclosed in my co-pending application utilizes a novel cooperation between the heel portion of a cutter link and the toe portion of an immediately following raker tooth for balancing the overturning torque on these two links when under load. The present depth gauge link with a curved heel portion which cooperates with an oppositely curved toe portion on the raker link immediately following and adjacent to the depth gauge link. In this manner the overturning torque on the raker tooth link is balanced substantially independently of the cutters which will presently be described in greater detail. With the present configuration, the depth gauge link and the depth gauge element or elements integral with the side cutter or cutters are so disposed as to prevent these elements from acting in fact as raker teeth thus keeping the chip, isolated by the two side cutters, in place until removed properly by the raker tooth means immediately following the cutters. While the illustrated embodiment is directed to a single right or left hand raker, it will be understood that any raker tooth means or a plurality of raker teeth could be used in place of that shown. The depth gauge links and certain of the depth gauge elements are also arranged to direct a normal flow of chips downwardly as viewed in the drawings, i.e., toward the center axis of the saw bar, past the cutters. In this manner, the loosened fibers and chips are prevented from wadding both in the area of the depth gauges and in the area of the cutters resulting in better chip flow and smoother cutting. The present configuration additionally provides a more positive control of the depth of cut both in the normal kerf and also when boring with the end of the bar since the curved portion of the depth gauge link ensures that the depth of cut remains the same regardless of the degree of flexure of the chain.

Accordingly, the primary object of the present invention is to provide an improved saw chain construction for balancing the overturning torque on the cutters and rakers and to provide a positive depth gauge action regardless of the flexure of the chain by the use of a novel depth gauge link and depth gauge elements used in conjunction with side cutter elements.

Another object of the present invention is to provide a saw chain construction of the character described which prevents removal of chips by the depth gauge and cutter means in advance of the raker tooth and in addition ensures proper flow of chips past the elements.

Another object of the present invention is to provide a saw chain construction of the character described wherein the depth gauge means for the raker tooth link is controlled so as to produce a smooth and even cut when the chain saw is used in a boring position.

Still another object of the present invention is to provide a novel cutter tooth configuration which results in better feed characteristics and which is more economical to manufacture.

These and other objects and advantages of the invention will be apparent from the following specification and claims and from the accompanying drawings wherein:

BRIEF DESCRIPTION OF THE DRAWINGS

FIG. 1 is a top plan view of a section of saw chain embodying the present invention;

FIG. 2 is a side elevational view thereof;

FIG. 3 is a cross-sectional view taken along lines 3—3 of FIG. 2;

FIG. 4 is a cross-sectional view taken along lines 4—4 of FIG. 2,

FIG. 5 is a cross-sectional view taken along lines 5—5 of FIG. 2 and

FIG. 6 is an elevational detail with certain parts removed showing the application of forces which balance the moments acting on the cutter and raker links when under cutting load.

DESCRIPTION OF THE PREFERRED EMBODIMENT

Referring now in detail to the drawings, FIGS. 1 and 2 illustrate a sequence of links and it will be understood that such sequence is repeated in the order and arrangement shown throughout the length of the chain. The chain includes spacer drive links, drive links which mount the depth gauge and the raker elements, side connector links and side cutter links. The side links indicated at 10 and 11 along with the other side links and together with the rivets 12 serve to join the center links in end-to-end pivotal relationship. The bottom surfaces of the side links provide a surface for supporting the chain on the rails of the saw bar in a well known manner. The side links 10 and 11 are merely positioned on opposite sides of the chain and are identical and interchangeable.

The center links of the chain are of three different forms, spacer links, depth gauge links and raker tooth links. The links 14 are identical and constitute the spacer links and also include sprocket engaging portions 16 which engage and are trained about the drive sprocket of the engine or power unit (not shown) for driving the chain in a well known manner.

The center links 17 have link body means which include a sprocket engaging portion 18 similar to the sprocket engaging portions 16 previously described. Each of the links 17 mounts or carries an integral raker tooth which extends from the body portion of the link and which may be laterally offset from the centerline of the chain in either direction. As will be observed in FIGS. 1 and 2, the raker tooth 19 is offset laterally in the opposite direction from the raker tooth 19a.

The raker tooth may have a straight inboard edge 21 and a slight rake angle or taper along the outside edge 22. As indicated in FIG. 2, the top surface of each raker tooth is downwardly inclined toward its trailing end to form a rake angle. It will be appreciated that the rake angle of both the top surface and the outside edge of the raker tooth may be varied depending upon the type of wood, the sped of the chain and other variable factors.

The cutter tooth means is made up of two side mounted cutters 26 which are pivotally connected by rivets 12 to the raker tooth links 19 and the center mounted depth gauge links 27. The side cutters 26 are identical in construction and are mirror images as will be obvious from FIGS. 1 and 3. Each side cutter 26 has a body portion which functions as a connector link and alternate cutters have a depth gauge element which is integral with the body portion. The cutter element itself comprises a laterally inclined wing or leg 28 which forms, with the other side cutter, a V-type cutter. The angle of the outwardly and upwardly extending cutter elements may, of course, be varied. As seen in FIG. 2, the cutter elements 28 may be formed with a top rake or taper and, as seen in FIG. 1, a side rake or taper angle. These rake angles are both variable as has been previously explained with reference to the raker tooth angle. Each cutter element 28 is provided with a flat surface 29 which extends the full length of the element. It has been found in practice that the use of a flat surface on the top of each cutter element, as opposed to the prior art concept of a sharp cutting edge, results in improved feed. In addition the flat surface significantly reduces the manufacturing cost of the cutters since they are easier to fabricate. With this configuration, it will be appreciated that the cutter elements 28 each sever the fibers below the depth of the normal kerf with the area between being then removed with a chisel action by the rakers 19 and 19a. FIG. 2 illustrates a method of sharpening the cutter elements wherein preferably a safe edge file 31 is drawn at an angle across the forward face of the cutter element at an angle with the longitudinal axis of the chain which may be varied to change the bite of the tooth. This provides a forward cutting edge 33 on each cutter element.

In addition to the cutter elements 28, alternate ones of the side cutter links are provided with an integral depth gauge element 34 which serves in a conventional manner to limit the depth of penetration of the cutter elements when the chain is travelling along its normal course. As shown in plan view in FIG. 1, the total lateral reach of the successive raker teeth 19 is less than the lateral distance between the forward points of the cutting edges 29 of the cutter elements 28. With this arrangement, the action of the raker teeth is limited to that of raking or chiseling out the area between the parallel cuts made by the cutter elements 28 and no side cutting is done by the raker teeth.

A center link depth gauge 27 includes a sprocket engaging root portion 36 which is identical to the other center mounted links and serves the same function. The upper portion of the body of the link 27 is formed with a curved surface 37 and is so formed as to provide a constant depth gauge action for the raker teeth 19 when they are pivoted relative to the chain which may occur during normal cutting and also when they pass over the curved end of the saw bar during boring. Thus, regardless of the position of relative rotation of the rakers on their pivot points, the depth gauge action is maintained. In addition, the link 27 and in particular the upper curved portion of the link, prevents clogging or wadding in front of the cutter elements and between the conventional depth gauge elements 34. Since the curved portion 37 is located between the cutter elements and the depth gauge elements 34, the area or chip between the cutter elements cannot be removed until after the cutter elements pass because of the presence of the curved portion 37. In this manner, the chip between the grooves cut by the cutter elements 28 is removed in proper fashion by rakers 19. This action overcomes a serious problem with prior art chains of this type in which the area about the cutter elements and preceding depth gauges or guard elements became clogged because of premature chip removal. Under certain circumstances depth gauge elements actually acted as rakers with the result of fuzzy cuts and clogging. This action is completely prevented with the present configuration.

In order to prevent the curved surface 37 of the depth gauge link 27 from ramping or riding on the top of previously severed chips because of its curvature, the forward portion of the edge may have a cut away section 38 most clearly seen in FIG.6. The vertical face of the cut away portion 38, in conjunction with the forward face depth gauge 34, will cause the chip to be deflected to one side or the other of the link. In order to allow the chips to flow downwardly as viewed in the drawings past the cutter element 28 and the raker teeth, one of the depth gauge elements 34 on one of the side cutters may be removed as illustrated in FIGS. 1 and 2 to allow the chips to flow past the cutter elements. The depth gauge elements 34 should be staggard on alternate sides along the length of the chain to provide for even flow. It will be noted that a concavely curved heel portion 39 is provided on the depth gauge link 27 which cooperates with a convexally curved toe portion 30 on the raker tooth link 17. The curved toe portion 40 is so formed as to engage the heel portion 39 of the depth gauge link when the raker is under load so as to transfer a lifting force acting on the forward portion of the raker tooth link to the depth gauge link for a purpose to be described.

The manner in which the overturning moments on the cutter means and raker tooth are balanced is shown in FIG. 6. Referring first of all to the side cutter, the pulling force on the chain creates a force in the direction indicated by the arrow a with a counter force being applied to the cutter elements as indicated at b during cutting. These forces create a moment tending to pivot the cutter elements about one of the rivets 12a in the direction indicated by the arrow c. This moment is balanced by resistance encountered when one or both of the depth gauge elements 34 bottoms against the surface of the kerf resulting in a downward force in the direction indicated by the arrow e acting against the pivot point 12a. In this manner, the overturning moment on the cutter link is balanced independently of any consideration of the raker tooth.

The pulling force on the chain creates a force on the raker tooth in the direction indicated by the arrow f with a counter force being applied on the tooth at g during cutting. These forces create a moment tending to pivot the raker tooth about the rivet 12b in the direction indicated by the arrow h. To counterbalance this moment a downward resistive force must be applied at pivot joint 12a as shown by the arrow j. The side link 10, of course, seats against the saw bar resulting in a counter force in the direction indicated by the arrow i acting against the rivet point 12b. A resistive force in the direction indicated by arrow j is created by the resistance encountered when the curved surface 37 of the depth gauge link 27 bottoms against the surface of the kerf resulting in a downward force in the direction indicated by the arrow k. The downward force on the forward end of the raker link in the direction of the arrow j is, of course, transmitted from the depth gauge link 27 through the cooperating surfaces 39 and 40 as previously explained. Conversely, if the resistive force as represented by arrow j is insufficient to balance the moment created about pivot point 12b, in the direction of arrow h, then pivot point 12a would lift and thus rotate the depth gauge link 27 about the rivet 12d in the direction indicated by the arrow l. Rotation of the depth gauge drive link about pivot point 12d in the direction of arrow l will lift both of the side cutters 26 in a vertical direction at both points 12a and 12c as well as the top of the curved surface 37 of the depth gauge link 27 until sufficient resistive force is encountered at the point of arrow k to balance the moment about 12b. The overturning torque on the raker tooth is thus balanced primarily by the resistive force created when the surface 37 of the depth gauge link 27 bottoms against the surface of the kerf. In addition, secondary forces are created by the drag on the surface 37 as it moves along the kerf and also the forces acting against the cutter elements themselves.

The present invention thus provides improvements over prior art chains in the nature of more precise control of the cutting action both during normal cutting regardless of the type of wood as well as during specialized cutting such as limbing or boring. The improved performance of the raker and cutter elements results in cleaner and faster cutting with provision being made for improved and increased chip flow.

As will be apparent to persons skilled in the art, various modifications and adaptations of the structure above described will become readily apparent without departing from the spirit and scope of the invention, the scope of which is defined in the appended claims.

The embodiments of the invention in which an exclusive property or privilege is claimed are defined as follows:

1. In a saw chain having links assembled in repetitive link sequences, each sequence including in combination: at least one center mounted raker tooth link, a center mounted raker tooth depth gauge link, said depth gauge link being independent from the remaining links in the sequence, means for transmitting overturning torque from said raker tooth link to said raker tooth depth gauge link, and side cutter elements pivotally connecting the raker tooth link to the raker tooth depth gauge link, said cutter elements having independently operating depth gauge means mounted thereon, said depth gauge links including a curved portion extending between said cutter elements and the depth gauge means therefor.

2. The combination according to claim 1 wherein said center mounted raker tooth link includes a toe portion having a first contact surface thereon and said center mounted depth gauge link includes a heel portion having a second contact surface in contact with said first contact surface for transmitting overturning torque on the raker tooth link to the depth gauge link, said side cutter elements including a pair of side links pivotally connecting the raker tooth link to the depth gauge link, each of said side links including upwardly and outwardly extending leg portions forming spaced side cutters, at least one of said side links including the independently operating depth gauge means for said cutter elements.

3. The combination according to claim 2 wherein; each of said leg portions has a substantially planar surface facing in the general direction of the kerf in which the chain travels and sloped away from the kerf in a rearward direction relative to the direction of travel of the chain to form a rake angle, said substantially planar surface being of a width less tan the thickness of the leg portion and extending substantially the longitudinal extent of the leg.

4. In a saw chain having a plurality of center links with sprocket engaging portions and side links with means pivotally joining said side links and said center links, said links being assembled in repetitive link sequences, each said sequence including in combination at least one center mounted raker tooth link having a first curved contact surface on the toe portion thereof, a center mounted depth gauge link having a second curved contact surface on the heel portion thereof in contact with said first contact surface for transmitting overturning torque on the raker tooth link to the depth gauge link, said depth gauge link being independent from the remaining links in the sequence, a pair of side links pivotally connecting the raker tooth link to the depth gauge link, each of said side links including upwardly and outwardly extending leg portions forming spaced side cutter elements, at least one of said side links including a depth gauge element integral therewith for limiting the depth of cut of said side cutter elements, the center mounted depth gauge link having a convexly curved upper edge extending between said side cutter elements and acting to limit the depth of cut of said raker tooth link.

5. The combination according to claim 4 wherein, said first contact surface is convexly curved and said second contact surface is concavely curved, said second contact surface being in overlying relation to said first contact surface, the convexly curved upper edge of said depth gauge link being so formed as to limit said raker tooth to a constant cutting depth regardless of the flexure of said chain.

6. The combination according to claim 5 wherein said depth gauge element is located forwardly of the associated side cutter element and adjacent the convexly curved upper edge of said depth gauge link.

7. The combination according to claim 6, wherein the depth gauge element is provided on alternate sides of said successive pairs of side links in successive link sequences, and the extreme forward portion of the curved upper edge of the depth gauge link has a cutaway area providing an abrupt shoulder for diverting chips to one side or the other of the center line of the chain depending on the location of said depth gauge elements.

8. The combination according to claim 7 wherein, each link sequence includes at least one pivotally connected center-mounted spacer drive link having a sprocket engaging root portion.

* * * * *